(12) United States Patent
Grüter et al.

(10) Patent No.: US 12,161,083 B2
(45) Date of Patent: Dec. 10, 2024

(54) RUBBER TEAT ELEMENT WITH FLEXIBLE HEAD GEOMETRY

(71) Applicant: GEA Farm Technologies GmbH, Bönen (DE)

(72) Inventors: Thomas Grüter, Lippstadt (DE); Benedikt Schürmann, Nottuln (DE)

(73) Assignee: GEA Farm Technologies GmbH, Bonen (DE)

( * ) Notice: Subject to any disclaimer, the term of this patent is extended or adjusted under 35 U.S.C. 154(b) by 0 days.

(21) Appl. No.: 17/534,579

(22) Filed: Nov. 24, 2021

(65) Prior Publication Data
US 2022/0079107 A1 Mar. 17, 2022

Related U.S. Application Data

(63) Continuation of application No. 15/743,146, filed as application No. PCT/EP2016/066479 on Jul. 12, 2016, now abandoned.

(30) Foreign Application Priority Data

Jul. 15, 2015 (DE) .................. 10 2015 111 476.3

(51) Int. Cl.
| | |
|---|---|
| *A01J 5/06* | (2006.01) |
| *A01J 5/04* | (2006.01) |
| *A01J 5/08* | (2006.01) |

(52) U.S. Cl.
CPC .............. *A01J 5/06* (2013.01); *A01J 5/041* (2013.01); *A01J 5/08* (2013.01)

(58) Field of Classification Search
CPC ................. A01J 5/06; A01J 5/08; A01J 5/041
See application file for complete search history.

(56) References Cited

U.S. PATENT DOCUMENTS

| | | | | |
|---|---|---|---|---|
| 3,659,557 | A * | 5/1972 | Noorlander | A01J 5/08 119/14.47 |
| 3,696,790 | A * | 10/1972 | Albright | A01J 5/08 119/14.47 |
| 4,332,215 | A * | 6/1982 | Larson | A01J 5/08 119/14.49 |
| 4,530,307 | A * | 7/1985 | Thompson | A01J 5/08 119/14.49 |
| 5,069,162 | A * | 12/1991 | Thompson | A01J 5/08 119/14.47 |
| 6,418,877 | B1 * | 7/2002 | Fredericks | A01J 7/025 119/14.47 |
| 6,745,718 | B1 * | 6/2004 | Chowdhury | A01J 5/08 119/14.47 |
| 6,755,153 | B1 * | 6/2004 | Chowdhury | A01J 5/08 119/14.47 |
| 8,567,346 | B1 * | 10/2013 | Alveby | A01J 5/16 119/14.49 |
| 2006/0016399 | A1 * | 1/2006 | Torgerson | A01J 7/04 119/14.49 |

* cited by examiner

*Primary Examiner* — Magdalena Topolski
*Assistant Examiner* — Marisa V Conlon
(74) *Attorney, Agent, or Firm* — BainwoodHuang

(57) ABSTRACT

The present invention provides a rubber teat element which, on account of the radial expandability of the head part, is able to adapt to different teat geometries, in particular in the case where an animal has small, thin and short teats. A teat cup and a milking cluster with a corresponding rubber teat element are also provided.

17 Claims, 4 Drawing Sheets

RUBBER TEAT ELEMENT WITH FLEXIBLE HEAD GEOMETRY

CROSS REFERENCE TO RELATED APPLICATIONS

This application is a continuation of U.S. application Ser. No. 15/743,146, filed Jan. 9, 2018, which is a national phase application under 35 U.S.C. § 371 of PCT Inter-national Application No. PCT/EP2016/066479, filed Jul. 12, 2016, which claims priority to German Application No. 10 2015 111 476.3 filed Jul. 15, 2015, the dis-closures of which are incorporated by reference herein.

FIELD AND BACKGROUND OF THE INVENTION

The object of the invention relates to a rubber teat element, to a teat cup having a corresponding rubber teat element and to a milking cluster including at least two teat cups and at least one corresponding rubber teat element.

A milking cluster, which comprises multiple teat cups, is used for the automatic milking of an animal, in particular of a cow. The teat cups, as a rule, are connected to a claw by means of short milk tubes. The milked milk is directed into a milk tank from the claw. Such an arrangement, however, is not absolutely necessary because the teat cups can also be connected directly, that is to say without the interposition of a claw, to a milk line of the milking system by means of a milk tube.

A teat cup includes a teat cup sleeve in which a rubber teat element is arranged. Various configurations of a rubber teat element are known. Thus, for example, EP 0 477 950 A1 describes a rubber teat element with a head part, on which is provided a sealing lip which delimits an insertion opening for the teat. The head part is connected to a shank part.

It is known that when an animal, in particular a cow, is being milked, the teat must not be constricted by the rubber teat element. In particular at the end of a milking operation, the teat cup can climb up on the teat in an unwanted manner. Numerous blood and lymph vessels are situated in the region of the Furstenberg rosette at the transition between the teat and the base of the udder. Said region is relatively sensitive such that it is possible for the blood and lymph vessels to be constricted as a result of the teat cup climbing up. This leads to a release of adrenalin, which results in a reduced milk flow or in the animal acting in a negative manner during milking. In order, however, to achieve complete strip milking of the udder, post milking work is necessary. This can result in the milking time being extended which can affect the condition of the teats.

In conjunction with the present invention, special attention is given to the start of the milking operation. The problem that arises here is that the anatomy and size of the teats of multiple animals and also of one animal can be very different. In addition, the teats of an animal can protrude from the udder at different angles and can be at different distances from one another. The known rubber teat elements, however, do not provide sufficient adaptability to the different teat geometries. In addition, at the start of milking, time lags can occur in the milking process on account of necessary alignments of the rubber teat elements or of the selection of different rubber teat elements.

A possible solution to the aforementioned problems is proposed in EP 1 954 120 B1. In this case, a region, which enables a relative movement between the head part and the shank part, is provided between the head part and the shank part. Such a region can be realized, for example, in the form of a joint. When the teats of an animal protrude from the udder at various angles, adaptation to the anatomy of the animal is made possible as a result of the relative movement between the head part and the shank part. Such an embodiment is relatively expensive to produce and does not yet solve the problem which is described below in conjunction with teats that are particularly small and thin.

The head outside contour of a known rubber teat element, in particular the lateral surface of the head, comprises, as a rule, a cylindrical or conical outside surface with a substantially constant diameter. The same applies to the inside contour at this point. Depending on the wall thickness in said region, in particular depending on the lateral surface thickness, the head is more or less flexible or more or less robust.

At the start of milking, a teat is inserted into the rubber teat element through the insertion opening. In this case, the lip of the rubber teat element rolls in and adapts to the teat. Such adaptation functions with known rubber teat elements only for a small range of teat geometries.

The problem increasingly arises of the teats, in particular of cows, always becoming smaller and thinner. When using known rubber teat elements, the problem arises, in particular in the case of small and thin teats, of the head outside diameter of said rubber teat elements being too large for an optimum milking result and in particular for sufficient adhesion of the rubber teat element to the teat. In said context, it must also be considered that the teats not only become smaller and thinner in a genetically intended manner, but are also—especially the rear teats—located closer and closer together. When the distance is so small that the teats touch one another, they are also referred to as so-called "kissing teats". In view of said developments, it is desirable to be able to shape the head outside diameter of the rubber teat element as small as possible.

Mere reduction of the head outside diameter, however, is a problem because high demands with reference to flexibility and at the same time robustness are made on the head or on the head part of a rubber teat element. If the head comprises too little flexibility, the rubber teat element is not sufficiently adaptable to different teat geometries. If, in contrast, the robustness of the head is not sufficient, during milking and in the case of a vacuum created at the same time in the interior of the head, it is possible for the head region or the lateral surface of the head part to collapse.

SUMMARY OF THE INVENTION

Proceeding from this point, the object underlying the present invention is to solve the problems described in conjunction with the prior art at least in part. To this end, a rubber teat element, which can be adapted to different teat geometries and enables gentler and in particular faster milking, in particular in the case of an animal with small and thin teats, is to be provided. In particular, a teat cup and a milking cluster, which are provided with a rubber teat element which solves the problems depicted in conjunction with the prior art at least in part, are also to be provided.

The objects are achieved by a rubber teat element, a teat cup and a milking cluster according to the respective independent claims. The respective dependent claims are focused on advantageous configurations. It must be pointed out that the features stated in the dependent claims can be combined together in an arbitrary, technically meaningful manner and can define embodiments of the invention. Over and above this, features provided in the claims are described and explained in more detail in the description, further preferred configurations of the invention being shown.

The rubber teat element according to the invention has a head part and a shank part. The shank part is connected to the head part. The head part has a lateral surface and an insertion opening for a teat of an animal. The insertion opening is delimited by an inwardly pointing lip. The rubber teat element is characterized in that the lateral surface has at least one expansion region. The expansion region extends over at least part of a lateral surface circumference. In addition, the expansion region extends over at least part of a head part length. The lateral surface is formed with an undulatory cross section in the expansion region.

The present invention advantageously enables a smaller overall height or head part length and a smaller outside diameter of the head part of the rubber teat element, nevertheless with good flexibility and robustness of the rubber teat element when inserting the teat and during milking. The expansion region enables a high level of flexibility and stretch which are necessary to a milking procedure which is gentle to the udder. Over and above this, on account of the flexibility and the stretch of the head part, a wide spectrum of teat geometries can be covered with one rubber teat element. In addition, improved performance is produced during milking because the rubber teat element can adapt quickly and simply to the different angles and geometries of the teats. This results, among other things, in a shortening of the milking time. At the same time, the rubber teat element provides improved adhesion because the head of the rubber teat element is better adapted to the different teat geometries.

The present invention turns away, in particular, from a realization variant of the rubber teat element with a joint between the shank part and the head part. Such a realization variant has been described in conjunction with the prior art. However, it is possible to combine the principle of the present invention with a joint between the head part and the shank part. Such a joint ensures, in particular, that the forces exerted against the inserted teats are constant over a wide range of different teat geometries. Such joints are no longer absolutely necessary in conjunction with the present invention because the expansion region of the head part provides sufficient flexibility and adaptability to different teat geometries.

On account of the lateral surface of the head part being formed with an undulatory cross section in the expansion region, the robustness of the head part is able to be increased, as a result of which it is possible to reduce the wall thickness or the lateral surface thickness of the head part. The advantage of such reduced lateral surface thickness, in turn, is that it is possible to increase the flexibility and the elasticity, in particular the radial stretch, of the head part with the good robustness of the head part remaining the same.

As a result of a reduced lateral surface thickness, an outside head diameter can also be reduced in relation to known rubber teat element geometries. This produces, in particular where the teats of an animal are closely set, improved adhesion because the rubber teat element heads no longer touch one another during milking and/or no longer obstruct the movement of one another. The present invention makes it possible, over and above this, to reduce the overall height of the rubber teat element head, here called the head part length. This is particularly advantageous in conjunction with the smaller and shorter teats of an animal. The rubber teat element proposed here can result in a better massage action in the case of smaller and shorter teats because a distance in the longitudinal direction from the insertion opening to the shank part is smaller and the shank part is consequently better able to surround shorter teats.

It is particularly advantageous that, on account of the expansion region, the head part is able to adapt to the teat geometry when the teat of the animal is inserted. Such adaptation is shown, in particular, in an outward bulge or in a radial expansion of the lateral surface of the head part. The region of the lateral surface, which is undulatory in cross section, advantageously provides for provision of additional material, in the manner of an accordion, a pair of bellows or the like. This can also be described, when viewed in the circumferential direction, by the lateral surface in the region of the undulatory cross section being longer in an unwound state than in a wound state.

On account of the reduced lateral surface thickness, increased elasticity can be achieved both in the radial direction and in the longitudinal direction. The advantage of increased elasticity of the head part in the longitudinal direction is additionally that a climbing movement at the end of the milking operation is able to be damped. If the rubber teat element knocks against the base of the udder on account of climbing at the end of the milking operation, the increased elasticity in the longitudinal direction can contribute to damping the impact and correspondingly can prevent pressure on the Furstenberg rosette.

The rubber teat element is realized with a head part and a shank part which is connected to the head part. In a preferred manner, the head part is integrally formed with the shank part. The head part and the shank part can be produced in the manner of a monobloc. In particular, the head part and the shank part are produced from a same material. This, is, however, not absolutely necessary because the head part and the shank part can also be produced from different materials. In a preferred manner, the head part is produced from a material which is softer compared to the material of the shank. As a result, a soft head part enables even better adaptation to the teat. Over and above this, the advantage of a soft head part is that it is better able to adapt to teats of varying dimension and position on the udder. The advantage of a harder shank part is that the wall thickness of the shank part is able to be reduced with the same compressive force, which brings about a saving in material. Over and above this, the mechanical load-bearing capacity of the shank part and consequently also the service life of the rubber teat element is increased. The rubber teat element can be produced, to this end, by means of two-component injection molding. The production can be effected simultaneously or serially or rather one after the other.

At least part of the rubber teat element is preferably formed from a plastics material, a plastics material mixture, a rubber or a silicone. This makes it possible for the rubber teat element to be realized in a food grade-approved manner. In particular, a thermoplastic elastomer (TPE) is provided at least in part. The rubber teat element can be produced, over and above this, by means of injection molding, compression molding, transfer injecting or pressing and/or vulcanizing or cross-linking.

A rubber teat element, as a rule, is a substantially rotationally symmetrical body. It is, however, not absolutely necessary for all part regions of the rubber teat element to be formed in a rotationally symmetrical manner. In this way, for example, the expansion region does not have to be rotationally symmetrical. The rotational axis, here, defines a longitudinal axis of the rubber teat element. The cross section of the lateral surface looked at here is substantially orthogonal or perpendicular to the longitudinal axis. A radial direction points outwardly from the longitudinal axis. Consequently, there is also a circumferential direction with reference to the rubber teat element which can be understood in a clockwise or anticlockwise manner.

The lateral surface is part of the head part. The lateral surface is a substantially rotationally symmetrical body about the longitudinal axis of the rubber teat element. The lateral surface has at least one expansion region which is not necessarily rotationally symmetrical. The lateral surface has a lateral surface circumference which can also be understood here as a central circumference of the lateral surface. The head part additionally has an insertion opening, through which a teat of an animal, in particular of a cow, can be inserted into the rubber teat element. The insertion opening is delimited, in particular in the radial direction, by an inwardly pointing lip. Once the teat of an animal is inserted into the rubber teat element, an inside edge of the lip can abut against the teat.

The expansion region extends over at least part of the lateral surface circumference. It is, consequently, not absolutely necessary for the lateral surface, when viewed in the circumferential direction, to be realized continuously with the expansion region. Rather, the lateral surface circumference can be divided into individual circumference segments, an expansion region not having to be present in each circumference segment. An expansion region can be present, for example, in each second circumference segment. Different expansion regions can also be provided in the segments. To this end, the cross section of the lateral surface in the relevant expansion regions or segments can comprises a different undulatory form. In addition, the expansion region extends over at least part of the head part length. The head part length, here, refers to the longitudinal axis. When viewed in the longitudinal direction, the expansion region, proceeding from the shank part, can begin at a distance from the shank part. When viewed in the longitudinal direction, the expansion region can additionally end at a distance from the inwardly pointing lip. The lateral surface can also be formed with a softer material compared to the material of the rest of the head part in the expansion region.

The lateral surface is formed with an undulatory cross section in the expansion region. The term undulatory is to be understood here, in particular, when viewed in the circumferential direction, as an inside radius of the lateral surface and/or an outside radius of the lateral surface not being constant. The undulatory cross section is describable, in particular, by an alternating occurrence of minima and maxima of a contour of the lateral surface when viewed in the circumferential direction. In terms of the invention, different undulatory forms are possible. Arcuate, in particular sinusoidal, or angular, in particular acute, undulatory forms are possible.

An undulatory form can also be formed on an expansion region outside surface and/or an expansion region inside surface by means of indentations. Such indentations can be arcuate or angular, in particular at the bottom of an indentation. It is also possible to combine individual undulatory forms with one another. In this case, for example, it is possible, when viewed in cross section, for an inside contour of the lateral surface to be realized in a substantially smooth manner in the region of the expansion region inside circumference, that is to say, when viewed in the circumferential direction, for it to comprise a constant inside radius, and when viewed in cross section, for an outside contour of the lateral surface to comprise an undulatory contour in the region of the expansion region outside circumference, such that here, when viewed in the circumferential direction, an outside radius of the lateral surface is not constant. In a reverse manner, it is also possible, when viewed in cross section, for an outside contour of the lateral surface to be realized in a substantially smooth manner in the region of the expansion region outside circumference, that is to say, when viewed in the circumferential direction, for an outer radius of the lateral surface to be constant, and when viewed in cross section, for an inside contour of the lateral surface to comprise an undulatory contour in the region of the expansion region inside circumference, that is to say, when viewed in the circumferential direction, for an inner radius of the lateral surface not to be constant. It is also possible for different undulatory forms to be provided in the region of the expansion region inside circumference and in the region of the expansion region outside circumference at least over a part region of the lateral surface circumference.

According to an advantageous configuration, it is proposed that the lateral surface comprises first indentations in the expansion region. The first indentations, when viewed in the circumferential direction, are spaced apart from one another. The first indentations are directed inwardly from an expansion region outside circumference. The expansion region has an expansion region outside surface. In addition, each first indentation has an indentation surface. A ratio of the sum of all the first indentation surfaces to the expansion region outside surface here is less than or equal to one. In a preferred manner, such a ratio is less than 0.9 and in a particularly preferred manner is less than 0.7.

A first indentation corresponds, in particular, when viewed in a radial direction from outside to inside, to a trough of a wave. The expansion region outside circumference forms, in particular, an outer envelope or an outermost circumference about the expansion region. The expansion region outside surface is to be understood as an entire outside surface of the expansion region. The expansion region outside surface corresponds, in particular, to the surface which the outside surface of the expansion region has with the expansion region in a stretched state, or in an unwound state. When the present undulatory form is arcuate, a first indentation surface corresponds to the surface which can be measured between two adjacent turning points of the undulatory form. Said turning points are located in the region of the first indentation or on two adjacent longitudinal edges of the first indentation. Turning points are to be understood here as the points at which the curvature of a contour changes from a clockwise curvature to an anticlockwise curvature or vice versa. A turning point can also be comprehended as the point at which the behavior of a curvature of a contour changes, for example as a result of a change from a right-hand curve to a left-hand curve or vice versa. Such a change is also designated as a curve change. If an angular undulatory form is present, the first indentation surface corresponds to the substantially level surface in the bottom of the wave trough, or in the bottom of the first indentation. If an acute undulatory form is present, the surface of the two tapered flanks can be understood as the first indentation surface.

According to an advantageous configuration, it is proposed that the lateral surface comprises, at least in the expansion region, a substantially constant lateral surface thickness. In addition, each first indentation has a first depth. A ratio of first depth to material thickness, here, is less than or equal to one. In a preferred manner, such a ratio is less than 0.9 and in a particularly preferred manner is less than 0.85.

The term lateral surface thickness is to be understood as an, in particular closest, distance between an outside surface of the lateral surface and an inside surface of the lateral surface. A first depth is, in particular, a shortest distance between the expansion region outside circumference and the deepest point of the first indention. The bottom of a first indentation can be comprehended as a deepest point. The first depth is to be understood here as a distance in the radial direction.

According to a further advantageous configuration, it is proposed that the lateral surface comprises, at least in the expansion region, a substantially constant lateral surface thickness. Each first indentation has a first depth. A ratio of first depth to lateral surface thickness is here greater than one. In a preferred manner, such a ratio is greater than 1.15 and in a particularly preferred manner is greater than 1.3.

According to yet another advantageous configuration, it is proposed that each first indentation has a first depth and the lip has a lip depth. A ratio of first depth to lip depth is here less than or equal to one. In a preferred manner, such a ratio is less than 0.6 and in a particularly preferred manner is less than 0.2. The lip depth designates here, in particular, the radially inwardly directed expansion of the lip.

According to an advantageous configuration, it is proposed that the head part has a head part length and each first indentation has a first indentation length. A ratio of first indentation length to head part length is here less than or equal to one. In a preferred manner, such a ratio is less than 0.9 and in a particularly preferred manner is less than 0.8. The first indentation length designates here the expansion of the first indentation in the longitudinal direction.

According to a further advantageous configuration, it is proposed that each first indentation has a first indentation length and the expansion region has an expansion region length. A ratio of first indentation length to expansion region length is here less than or equal to one. In a preferred manner, such a ratio is less than 0.9 and in a particularly preferred manner is less than or equal to 0.85. Such a ratio, however, is in a preferred manner at least 0.6 and in a particularly preferred manner at least 0.7.

The expansion region length designates here the expansion of the expansion region in the longitudinal direction. In a preferred manner, the expansion region length is constant when viewed in the circumferential direction. However, this is not absolutely necessary because the expansion region length can also be formed in a variable manner over the lateral surface circumference. It is further preferred that the first indentation length corresponds to the expansion region length.

When the first indentation length is less than the expansion region length, at least one first proportion of first indentations, when viewed in the longitudinal direction, can begin at a bottom edge of the expansion region and a second proportion of first indentations can begin at a top edge of the expansion region. The first indentations, when viewed in the longitudinal direction, can end in each case prior to reaching the oppositely situated edge. With reference to a cross section of the lateral surface, there can consequently also be an overlap of first indentations. An overlap region can be created here when viewed in the longitudinal direction. It is preferred for the first indentations to extend in a direction parallel to the longitudinal direction. However, this is not absolutely necessary because the first indentations can also extend at an angle or in a skewed manner with respect to the longitudinal direction. As a result, when viewed in the longitudinal direction, there can also be an overlap region of first indentations.

According to a further advantageous configuration, it is proposed that the first in-dentitions are arranged equidistantly to one another in the circumferential direction.

According to an advantageous configuration, it is proposed that the lateral surface comprises second indentations in the expansion region. The second indentations, when viewed in the circumferential direction, are spaced apart from one another. The second indentations are directed outwardly from an expansion region inside circumference. The expansion region has an expansion region inside surface. Each second indentation has a second indentation surface. A ratio of the sum of all the second indentation surfaces to the expansion region inside surface here is less than or equal to one. In a preferred manner, such a ratio is less than or equal to 0.9 and in a particularly preferred manner is less than or equal to 0.85.

A second indentation corresponds, in particular when viewed in a radial direction from inside to outside, to a trough of a wave. The expansion region inside circumference is, in particular, an innermost circumference of the expansion region. The expansion region inside surface is to be understood as an entire inside surface of the expansion region. The expansion region inside surface corresponds, in particular, to the surface which the inside surface of the expansion region has with the expansion region in a stretched state, or in an unwound state. When the present undulatory form is arcuate, a second indentation surface corresponds to the surface which can be measured between two adjacent turning points of the undulatory form. Said turning points are located in the region of the second indentation or on two adjacent longitudinal edges of the second indentation. Turning points are to be understood here as the points at which the curvature of a contour changes from a clockwise curvature to an anti-clockwise curvature or vice versa. A turning point can also be comprehended as the point at which the behavior of a curvature of a contour changes, for example as a result of a change from a right-hand curve to a left-hand curve or vice versa. Such a change is also designated as a curve change. If an angular undulatory form is present, the second indentation surface corresponds to the substantially level surface at the bottom of the wave trough, or at the bottom of the second indentation. If an acute undulatory form is present, the surface of the two tapered flanks can be understood as the second indentation surface.

According to an advantageous configuration, it is proposed that the lateral surface, at least in the expansion region, comprises a substantially constant lateral surface thickness. In addition, each second indentation has a second depth. A ratio of second depth to lateral surface thickness is here less than or equal to one. In a preferred manner, such a ratio is less than 0.9 and in a particularly preferred manner is less than 0.85.

The term lateral surface thickness is to be understood as an, in particular, shortest distance between an outside surface of the lateral surface and an inside surface of the lateral surface. A second depth is, in particular, a shortest distance between the expansion region inside circumference and the deepest point of the second indentation. The bottom of the second indentation can be comprehended as a deepest point. The second depth is to be understood here as a distance in the radial direction.

According to a further advantageous configuration, it is proposed that the lateral surface, at least in the expansion region, comprises a substantially constant lateral surface thickness. Each second indentation has a second depth. A ratio of second depth to lateral surface thickness is here greater than one. In a preferred manner, such a ratio is greater than 1.15 and in a particularly preferred manner is greater than 1.3.

According to yet another advantageous configuration, it is proposed that each second indentation has a second depth and the lip has a lip depth. A ratio of second depth to lip depth is here less than or equal to one. In a preferred manner, such a ratio is less than 0.6 and in a particularly preferred manner is less than 0.2. The lip depth designates here the radially inwardly directed expansion of the lip.

According to an advantageous configuration, it is proposed that the head part has a head part length and each second indentation has a second indentation length. A ratio of second indentation length to head part length is here less than or equal to one. In a preferred manner, such a ratio is less than 0.9 and in a particularly preferred manner is less than 0.8. The second indentation length designates here the expansion of the second indentation in the longitudinal direction.

According to a further advantageous configuration, it is proposed that each second indentation has a second indentation length and the expansion region has an expansion region length. A ratio of second indentation length to expansion region length is here less than or equal to one. In a preferred manner, such a ratio is less than 0.9 and in a particularly preferred manner is less than 0.85. Such a ratio, however, in a preferred manner is at least 0.6 and in a particularly preferred manner is 0.7. The expansion region length designates here the expansion of the expansion region in the longitudinal direction. In a preferred manner, the expansion region length is constant when viewed in the circumferential direction. However, this is not absolutely necessary because the expansion region length can also be formed in a variable manner over the lateral surface circumference. It is further preferred for the second indentation length to correspond to the expansion region length.

When the second indentation length is less than the expansion region length, at least one first proportion of second indentations, when viewed in the longitudinal direction, can begin at a bottom edge of the expansion region and a second proportion of second indentations can begin at a top edge of the expansion region. The second indentations, when viewed in the longitudinal direction, can end in each case prior to reaching the oppositely situated edge. With reference to a cross section of the lateral surface, it is consequently possible for the second indentations to overlap. When viewed in the longitudinal direction, an overlap region can be created in this connection. It is preferred for the second indentations to extend in a direction parallel to the longitudinal direction. However, this is not absolutely necessary because the second indentations can also extend at an angle or in a skewed manner with respect to the longitudinal direction. As a result, when viewed in the longitudinal direction, there can be an overlap region of second indentations.

According to a further advantageous configuration, it is proposed that the second indentations are arranged equidistantly with respect to one another in the circumferential direction.

According to a further advantageous configuration, it is proposed that the lateral surface, at least in the expansion region, comprises a substantially constant lateral surface thickness. In a preferred manner, the entire lateral surface comprises a substantially constant lateral surface thickness.

According to a further advantageous configuration, it is proposed that the head part has a head part length and the expansion region has an expansion region length. A ratio of expansion region length to head part length is here less than or equal to one. In a preferred manner, such a ratio is less than 0.8 and in a particularly preferred manner is less than 0.7.

According to a further advantageous configuration, it is proposed that the shank part is formed in one piece with a short milk tube on an end located opposite the head part. Such a realization is also designated as a monobloc. In a preferred manner, the rubber teat element and the short milk tube are formed from a common material, in particular from rubber or silicone. In this connection, the rubber teat element can also be formed from a softer material than the short milk tube. Reference is made here to the above-described realizations and production methods of the rubber teat element and of the materials thereof.

According to a further aspect, the invention relates to a teat cup having a rubber teat element. The rubber teat element is realized with a head part and a shank part which is connected to the head part, wherein the head part has a lateral surface and an insertion opening for a teat of an animal. The insertion opening, in this case, is delimited by an inwardly pointing lip. Over and above this, the lateral surface has at least one expansion region. The expansion region extends over at least part of a lateral surface circumference and at least part of a head part length. The lateral surface is formed with an undulatory cross section in the expansion region.

A teat cup also includes a teat cup sleeve. In a preferred manner, the rubber teat element is connected to the milk cup sleeve in a non-positive locking manner and/or in a positive locking manner.

The advantages and particular features depicted above for the rubber teat element according to the invention are transferrable in a corresponding manner to the milk cup described here. In particular, the milk cup can also be developed further in a manner corresponding to the rubber teat element according to the invention. Full reference is made here to the above explanations and characterizations of the rubber teat element according to the invention According to a further aspect, the invention relates to a milking cluster having a claw and at least two teat cups. In this connection, at least one of the teat cups is realized having a rubber teat element with a head part and a shank part which is connected to the head part, wherein the head part has a lateral surface and an insertion opening for a teat of an animal. The insertion opening, in this case, is delimited by an inwardly pointing lip. Over and above this, the lateral surface has at least one expansion region. The expansion region extends over at least part of a lateral surface circumference and at least part of a head part length. The lateral surface is formed with an undulatory cross section in the expansion region.

The advantages and particular features depicted above for the rubber teat element according to the invention are transferrable in a corresponding manner to the milking cluster described here. In particular, the milking cluster can also be developed further in a manner corresponding to the rubber teat element according to the invention. Full reference is made here to the above explanations and characterizations of the rubber teat element according to the invention.

The invention and the technical environment are explained in more detail below by way of the figures. It must be pointed out that the figures show particularly preferred realization variants and details of the invention, said invention, however, is not limited to these preferred realization variants and details. The figures and in particular the proportions shown therein are only schematic. The figures are as follows:

DETAILED DESCRIPTION OF THE DRAWINGS

Figure 1:
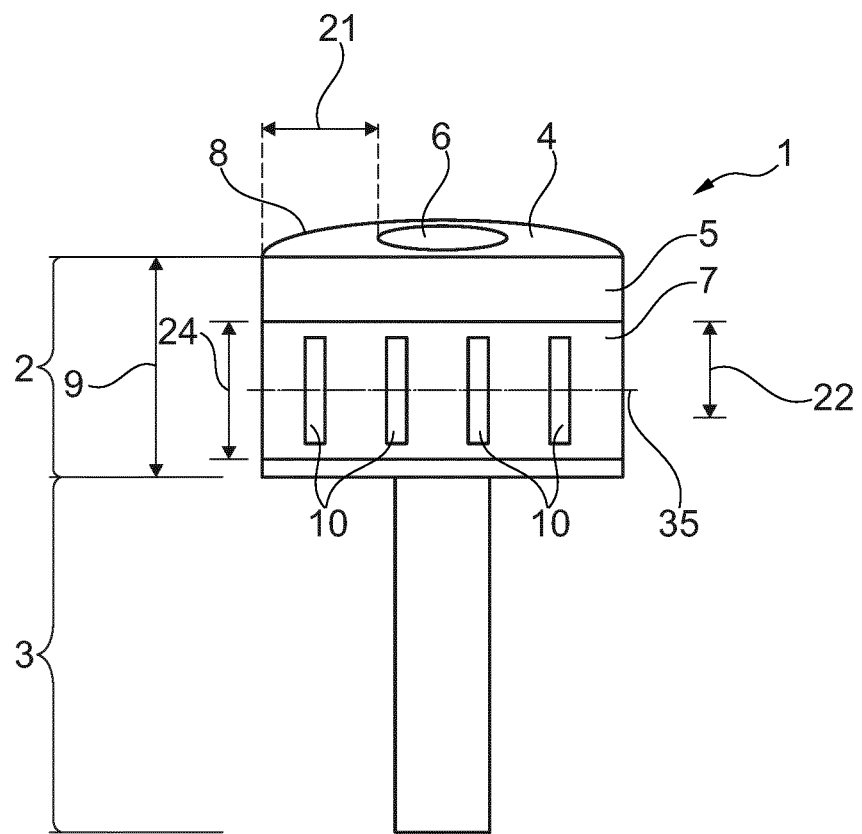
FIG. 1: shows a perspective view of a rubber teat element.

FIG. 1 shows a perspective view of a rubber teat element 1. The rubber teat element 1 is formed with a head part 2 and a shank part 3 which is connected to the head part 2. The head part 2 has a lateral surface 5 and an insertion opening 6 for a teat of an animal. The head part 2 has additionally an inwardly pointing lip, the insertion opening 6 being delimited radially outwardly by the lip 4. The lip 4 has a lip depth 21 in the radial direction. The rubber teat element 1 is formed in one part.

It can be seen from the representation according to FIG. 1 that the lateral surface 5 has an expansion region 7. The expansion region 7 extends here over a lateral surface circumference 8. In addition, the expansion region 7 extends over part of a head part length 9. The extension of the expansion region 7 in the longitudinal direction is shown as an expansion region length 24. The lateral surface 5 is formed with an undulatory cross section in the expansion region 7. The lateral surface 5 has first indentations 10 in the expansion region 7 for this purpose. The first indentations 10 have a first indentation length 22 and, when viewed in the circumferential direction, are arranged spaced apart from one another. The cross-sectional plane 35 is indicated in FIG. 1 by means of a dot-dash line.

Figure 2:
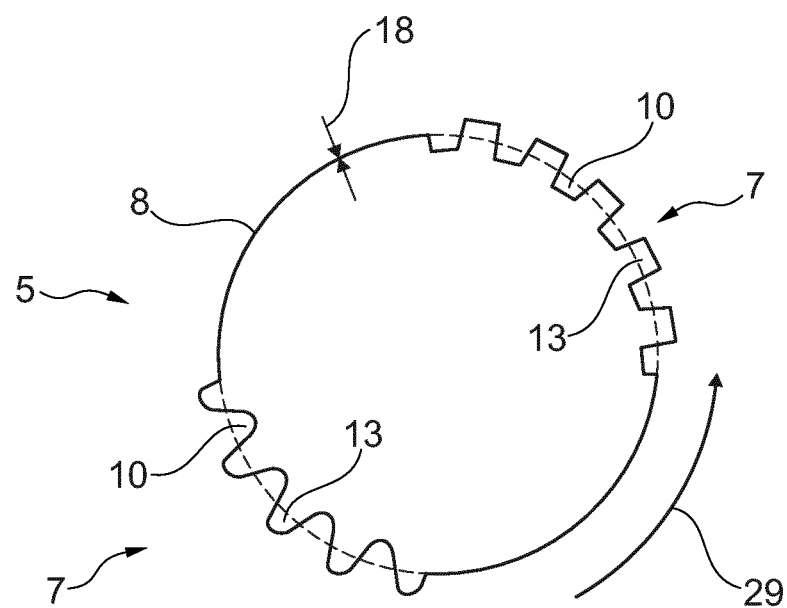
FIG. 2: shows a schematic view of an undulated cross section of the lateral surface.

FIG. 2 shows a schematic view of an undulated cross section of the lateral surface 5. It is shown that an expansion region 7 can also only extend over part of the lateral surface circumference 8. It can additionally be seen that the lateral surface 5 can have more than one expansion region 7. Two oppositely situated expansion regions 7, which are realized with different undulatory forms, are shown here. FIG. 2 additionally shows a constant lateral surface thickness 18 and a circumferential direction 29.

It can be seen in the cross-sectional view in FIG. 2 that the lateral surface 5 comprises first indentations 10 and second indentations 13 in the expansion region 7. The indentations 10, 13, when viewed in the circumferential direction, are spaced apart from one another. The first indentations 10, when viewed in the radial direction, point from outside to inside and the second indentations 13, when viewed in the radial direction, point from inside to outside. Two expansion regions 7, which are undulatory in cross section, are formed here by way of the first indentations 10 and the second indentations 13. The head part 2 is expandable in the radial direction due to the expansion regions 7 and to the undulations.

Figure 3:
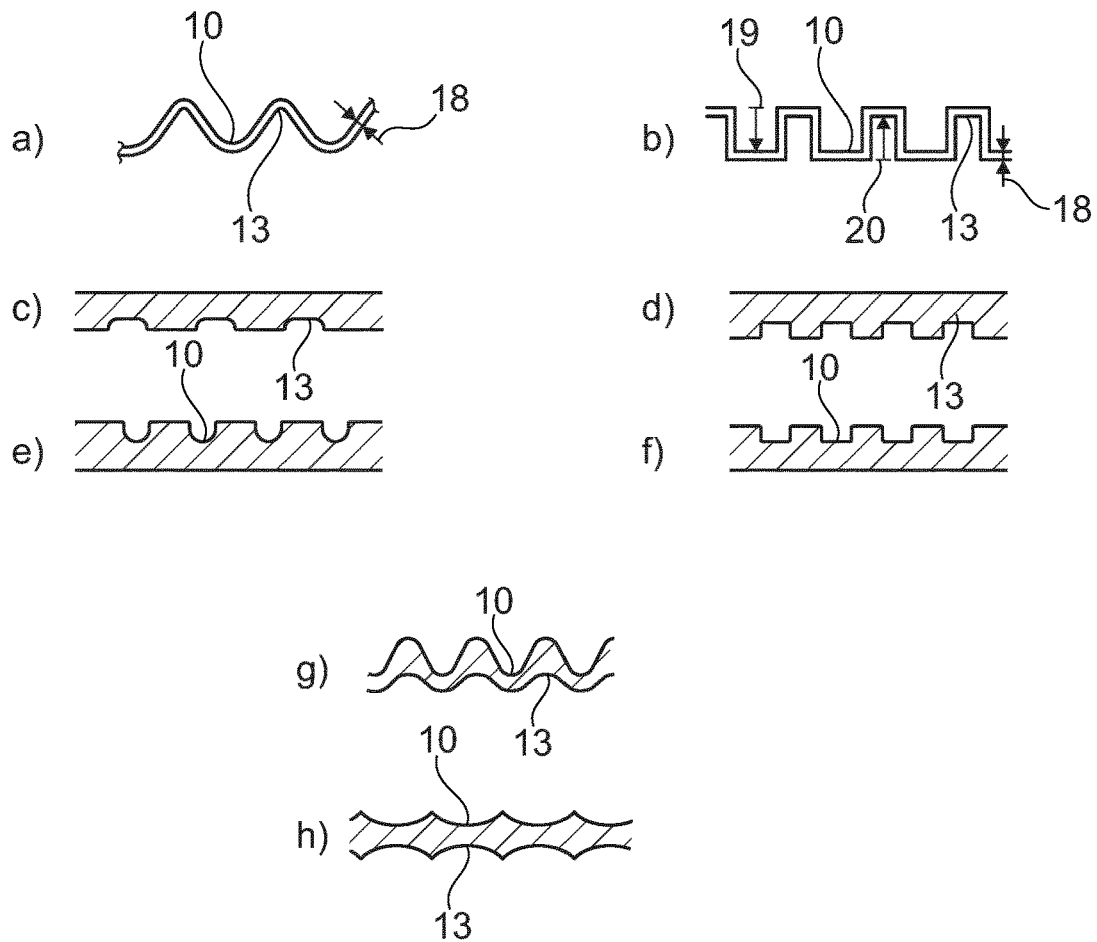
FIG. 3: shows schematic views of exemplary undulatory forms.

FIG. 3 shows schematic views of exemplary undulatory forms. The undulatory forms or undulations are each shown in cross section, the undulations being shown here in a simplified horizontal manner and not curved about the center of a circle. The undulatory forms of examples a) and b) each comprise a constant lateral surface thickness 18. First indentations 10 and second indentations 13 are shown. A first depth 19 and a second depth 20 are shown by way of example b). Example a) shows an arcuate undulatory form and example b) shows an angular undulatory form. In the examples in FIG. 3, the outside of the expansion region is shown in each case at the top and the inside of the expansion region is shown in each case at the bottom.

Examples c) and d) of FIG. 3 show that the outside of the lateral surface can also be realized in a substantially smooth manner in the expansion region. Here, in each case only the inside of the lateral surface is formed with an undulating contour in cross section. Example c) shows here an arcuate undulatory form and example d) shows an angular undulatory form. Examples e) and f) show that only the outside of the lateral surface can also be formed with an undulatory contour in cross section, the inside of the lateral surfacing being formed here in a substantially smooth manner in the expansion region. Example e) shows an arcuate undulatory form and example f) shows an angular undulatory form. Second indentations 13 are consequently shown in examples c) and d), first indentations 10 being shown in examples e) and f).

Further exemplary undulatory forms are shown in examples g) and h) of FIG. 3. Example g) illustrates that the undulation of the outside and the undulation of the inside do not have to have the same amplitude nor the same wave length. First indentations 10 and second indentations 13 are shown. Example h) shows that the undulations can also be opposed, first indentations 10 and second indentations 13, when viewed in the radial direction, being located opposite one another. Examples c)-h) also show that the lateral surface 5 does not necessarily have to have a constant lateral surface thickness 18 in the expansion region 7.

Figure 4:
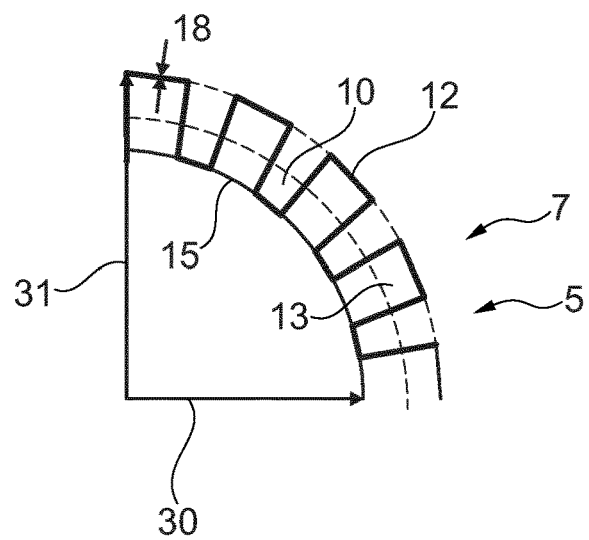
FIG. 4: shows a schematic view of part of an undulated cross section of the lateral surface.

FIG. 4 shows a schematic view of part of an undulated cross section of the lateral surface 5. An angular undulatory form is shown in FIG. 4. An expansion region inside radius 30 and an expansion region outside radius 31 of the expansion region 7 can be seen. Over and above this, the expansion region 7 has an expansion region outside circumference 12 and an expansion region inside circumference 15, which are shown here in each case by broken lines. Part of the lateral surface 5 is shown here in cross section and it can be seen that the lateral surface has first indentations 10 and second indentations 13 in the expansion region 7. Once again, the lateral surface 5 has a constant lateral surface thickness 18.

Figure 5:
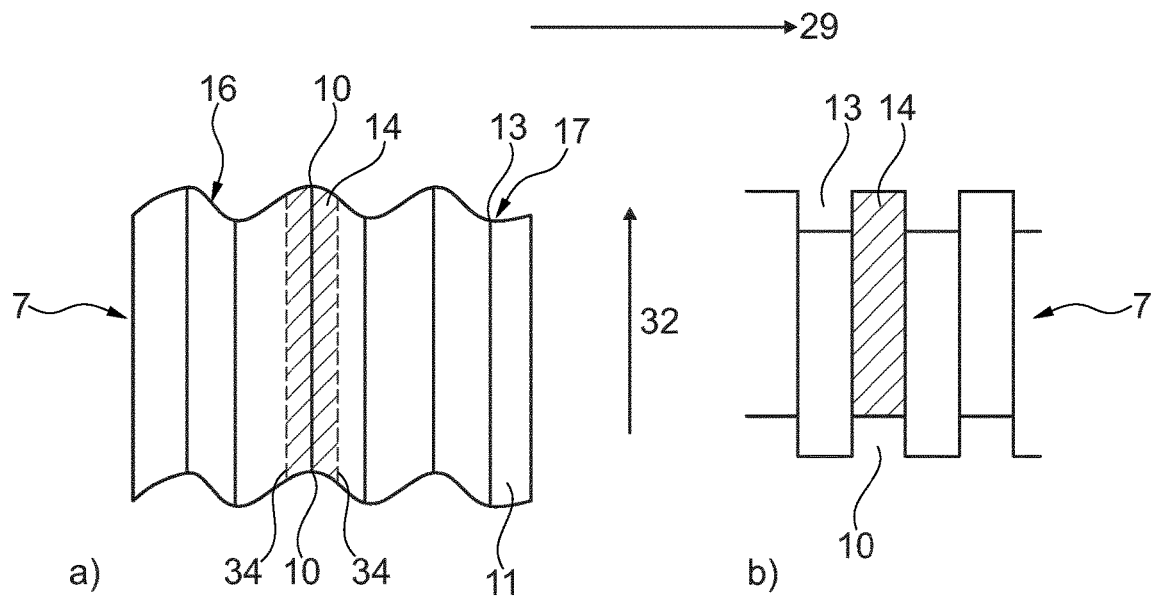
FIG. 5: shows schematic views of indentation surfaces of exemplary undulatory forms.

FIG. 5 shows schematic views of indentation surfaces of exemplary undulatory forms. Example a) shows an arcuate undulatory form and example b) shows an angular undulatory form. A longitudinal direction 32 and a circumferential direction 29 are marked here for orientation purposes. The view, when seen in the radial direction, is directed here from outside to inside to an outer part of the expansion region 7. First indentations 14 and second indentations 10 can be seen in said direction of view. Example a) shows an arcuate undulatory form, the first indentation surface 14 here being the surface between two adjacent turning points of the undulation in the region of the first indentation 10. The turning points 34 are shown here as dotted lines along the longitudinal direction 32. Examples a) and b) of FIG. 5 each show a first indentation surface 14 in a hatched manner. The second indentation surfaces 17 cannot be seen on account of the direction of view taken here, they are, however, to be understood in an analogous manner to the first indentation surfaces 14. As the view is directed from outside to inside in the radial direction, an expansion region outside surface 11 can also be seen here. The expansion region outside surface 11 is the entire outside surface of the expansion region 7. The expansion region inside surface 16 cannot be seen on account of the direction of view. The expansion region inside surface 16 is to be understood in an analogous manner to the expansion region outside surface 11 and consequently describes the entire inside surface of the expansion region 7.

Example b) of FIG. 5 shows an angular undulatory form. As the view, when seen in the radial direction, is directed from outside to inside, a first indentation surface 14 of a first indentation 10 can be seen here. When an angular undulatory form is present, it is not necessary to use turning points for determining the first indentation surface 14. The first indentation surface 14 relates here to the substantially even surface in the bottom of the first indentation 10 which can also be comprehended in said direction of view as a wave trough.

Figure 6:
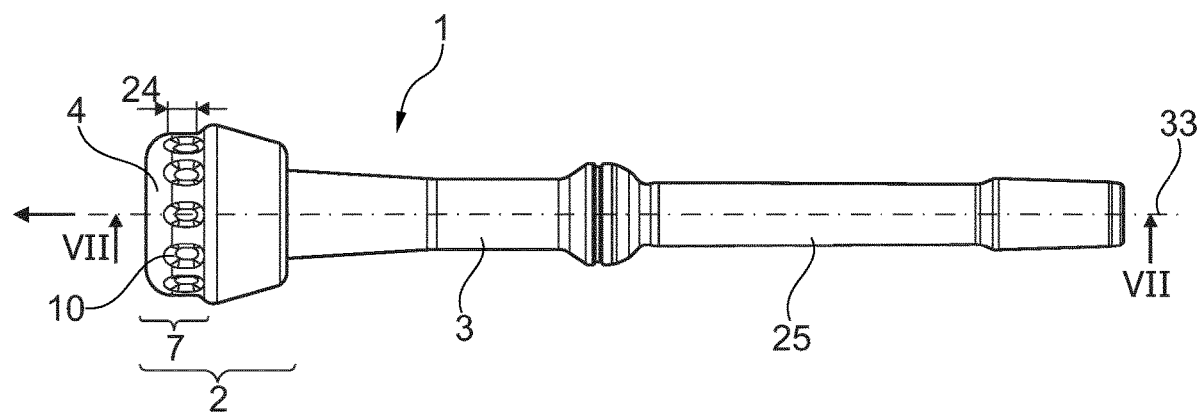
FIG. 6: shows a perspective view of a rubber teat element with a short milk tube.

FIG. 6 shows a perspective view of a rubber teat element 1 with a short milk tube 25. The rubber teat element 1 and the short milk tube 25 are connected together fixedly at the end of the shank part 3. The rubber teat element and the short milk tube 25 are formed in one piece here. Such a one-piece realization of rubber teat element 1 and short milk tube 25 is also designated as a monobloc. The longitudinal axis 33 of the rubber teat element 1 is marked in FIG. 6. The longitudinal axis 33 relates here to the rotational axis of the rubber teat element 1. A longitudinal direction 32 is additionally shown.

It can be seen from the representation according to FIG. 6 that the lateral surface 5 of the head part 2 has an expansion region 7. The expansion region 7 extends in the longitudinal direction 32 over an expansion region length 24. It can also be seen that the lateral surface 5 comprises first indentations 10 in the expansion region 7.

Figure 7:
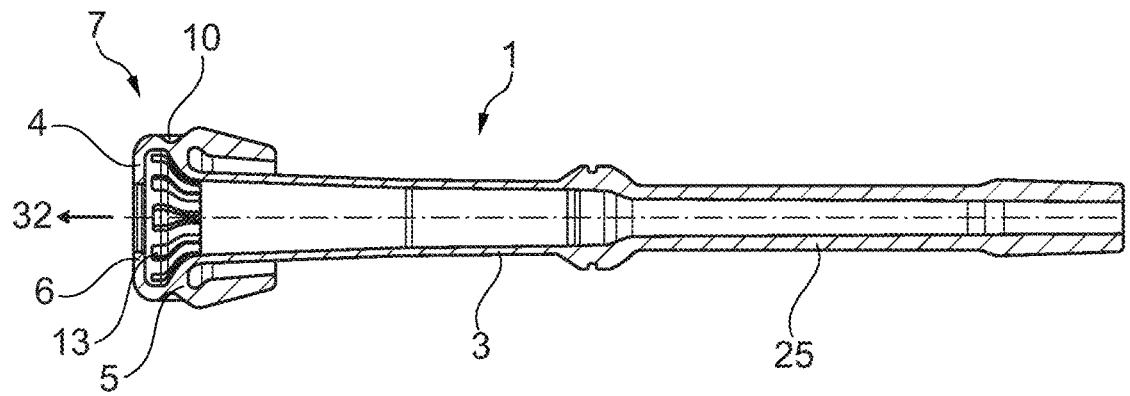
FIG. 7: shows a sectional representation of a rubber teat element with a short milk tube.

FIG. 7 shows a sectional representation of a rubber teat element 1 with a short milk tube 25. The cutting plane viewed in FIG. 7 is marked in FIG. 6 as section VII-VII. It can be seen in the sectional representation that the rubber teat element 1 and the short milk tube 25 are formed in one piece. In the present example, the rubber teat element 1 which is connected to a short milk tube 25 is produced from silicone and as a monobloc.

According to the representation according to FIG. 7, it can also be seen that the lateral surface 5 comprises first indentations 10 in the expansion region 7. An insertion opening 6 for a teat of an animal can also be seen. The insertion opening 6 is delimited by an inwardly pointing lip 4.

Second indentations 13 can also be seen from the sectional representation according to FIG. 7. The second indentations 13 are formed running in opposition to the longitudinal direction 32. To this end, the second indentations are tapered in each case in opposition to the longitudinal direction 32. The second indentations 13 follow an inner profile of the rubber teat element 1 in this connection.

Figure 8:
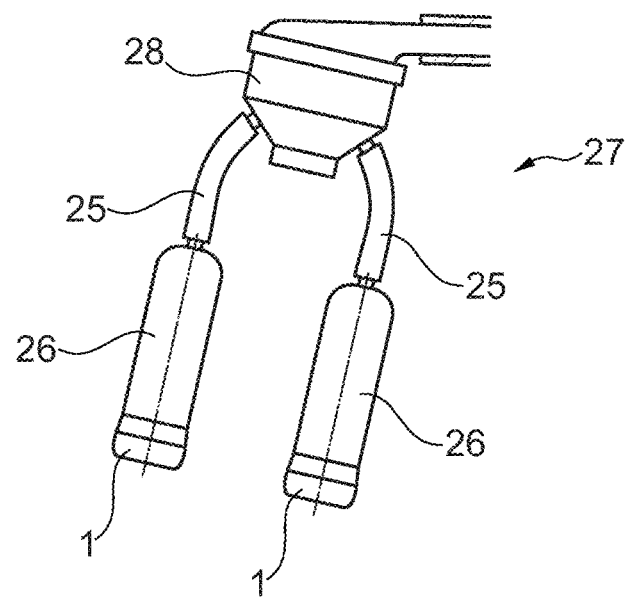
FIG. 8: shows a perspective view of a milking cluster.

FIG. 8 shows a perspective view of a milking cluster 27. The milking cluster 27 includes here a claw 28 and two teat cups 26. The teat cups 26 are each realized with a rubber teat element 1. The teat cups 26 are each connected to the claw 28 by means of a short milk tube 25.

The invention claimed is:

1. A teat cup liner comprising:
    a shank extending in a longitudinal direction of the teat cup liner;
    a one-part head joined to the shank and having:
        a lip defining a teat opening; and
        a lateral outer surface extending in the longitudinal direction of the teat cup liner, and having:
            an expansion region disposed between the lip and the shank and having a length extending in the longitudinal direction during milking, the expansion region joined to the lip and disposed to expand in a radial and circumferential direction along the length of the expansion region during milking, wherein the expansion region comprises a plurality of spaced apart and inwardly directed first indentations in the lateral outer surface, the first indentations forming parts of an undulatory cross-sectional shape disposed to unwind circumferentially as the expansion region expands; and
            a skirt joined to the expansion region and spaced radially outwardly from the shank.

2. The teat cup liner of claim 1, and wherein:
    the expansion region is disposed to expand in a longitudinal direction during milking.

3. The teat cup liner of claim 1, and wherein:
    the expansion region expands in a radial direction relative to a teat cup recess defined between the shank and the skirt during milking.

4. The teat cup liner of claim 1, and wherein:
    the expansion region is spaced apart from a teat cup recess defined between the shank and the skirt.

5. The teat cup liner of claim 1, and wherein:
    the expansion region expands radially outwardly from the shank and the skirt.

6. The teat cup liner of claim 1, and wherein each first indentation has a first depth and the lip has a lip depth, and a ratio of the first depth to the lip depth is less than or equal to one.

7. The teat cup liner of claim 1, and wherein the first indentations are arranged equidistantly with respect to one another in the circumferential direction.

8. The teat cup liner of claim 1, and wherein the expansion region further comprises:
    a plurality of outwardly directed and circumferentially spaced apart second indentations, wherein the second indentations are directed outwardly from an expansion region inside circumference.

9. The teat cup liner of claim 8, and wherein the second indentations are arranged equidistantly with respect to one another in the circumferential direction.

10. The teat cup liner of claim 1, and wherein the shank is formed integrally with a short milk tube on a shank end located opposite to the one-part head.

11. The teat cup liner of claim 1, wherein the expansion region is formed entirely below the lip and within the lateral outer surface of the one-part head.

12. The teat cup liner of claim 1, wherein the lateral outer surface extending in the longitudinal direction further includes a second region adjacent to the expansion region that does not have an undulating cross-section.

13. The teat cup liner of claim 12, wherein the second region is disposed between the expansion region and the lip, such that the expansion region is joined to the lip via the second region.

14. A teat cup liner comprising:
- a shank extending in a longitudinal direction of the teat cup liner; and
- a one-part head joined to the shank and having a lateral outer surface, the one-part head including:
  - a lip defining a teat opening; and
  - an expansion region formed in the lateral outer surface and disposed between the lip and the shank, the expansion region (i) having a length that extends in the longitudinal direction during milking and (ii) including multiple indentations that form an undulatory, cross-sectional shape disposed to unwind circumferentially during milking as the expansion region expands.

15. The teat cup liner of claim 14, wherein the expansion region is joined with the lip via a transitional region, and wherein the transitional region does not have the undulatory, cross-sectional shape.

16. The teat cup liner of claim 15, wherein the transitional region has an outer diameter that tapers inwardly from the expansion region to the lip.

17. The teat cup liner of claim 16, wherein the tapered outer diameter is rounded.

\* \* \* \* \*